No. 872,255.　　　　　　　　　　　　　　　　　　PATENTED NOV. 26, 1907.
H. P. SAUNDERSON.
MOTOR VEHICLE FOR AGRICULTURAL PURPOSES.
APPLICATION FILED NOV. 12, 1906.

3 SHEETS—SHEET 1.

Fig.1

No. 872,255. PATENTED NOV. 26, 1907.
H. P. SAUNDERSON.
MOTOR VEHICLE FOR AGRICULTURAL PURPOSES.
APPLICATION FILED NOV. 12, 1906.

3 SHEETS—SHEET 3.

Witnesses.
John E. Dousfield.
C. G. Redfern.

Inventor.
H. P. Saunderson

UNITED STATES PATENT OFFICE.

HERBERT PERCY SAUNDERSON, OF BEDFORD, ENGLAND.

MOTOR-VEHICLE FOR AGRICULTURAL PURPOSES.

No. 872,255.   Specification of Letters Patent.   Patented Nov. 26, 1907.

Application filed November 12, 1906. Serial No. 343,099.

*To all whom it may concern:*

Be it known that I, HERBERT PERCY SAUNDERSON, a subject of the King of Great Britain, residing at Elstow Works, Bedford, Bedfordshire, England, have invented new and useful Improvements in or Connected with Motor Vehicles or Tractors for Agricultural and other Purposes, of which the following is a specification.

My invention relates to motor tractors or vehicles chiefly designed for use in hauling plows and other agricultural implements over the land but also applicable for hauling purposes generally and for driving threshing or other machinery, the object of my invention being to provide means whereby all the wheels of the vehicle may be driven so as to obtain the greatest possible grip upon the ground and thereby obtain a maximum of tractive power from a motor of a given weight.

A vehicle or tractor arranged in accordance with my present invention is provided with three traveling wheels, namely, a pair of front steering wheels and a single rear wheel. The steering wheels which are mounted on a divided axle have motion transmitted directly to them through the medium of gearing. In order to transmit motion to the rear wheel I connect a shaft to the balance box of the differential gearing and I fix on this shaft a gear wheel through which motion is transmitted through suitable shafts and gearing.

To enable my invention to be fully understood I will describe the same by reference to the accompanying drawings, in which:—

Figure 2:
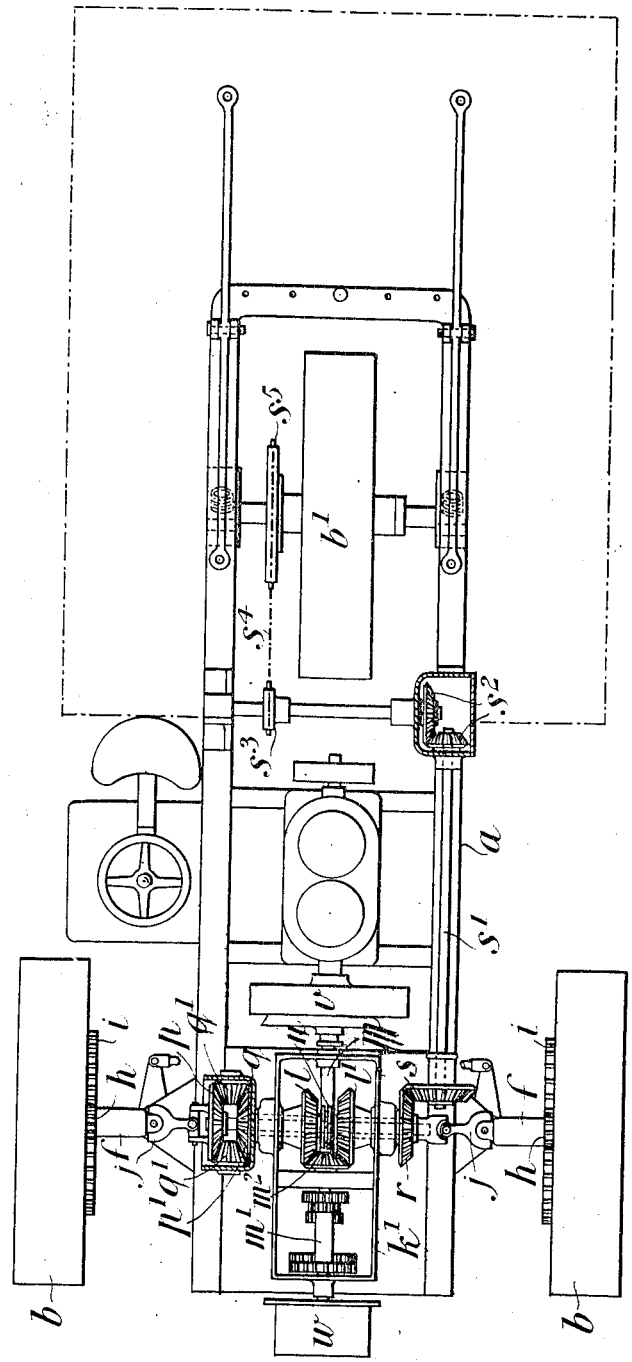
Figure 3:
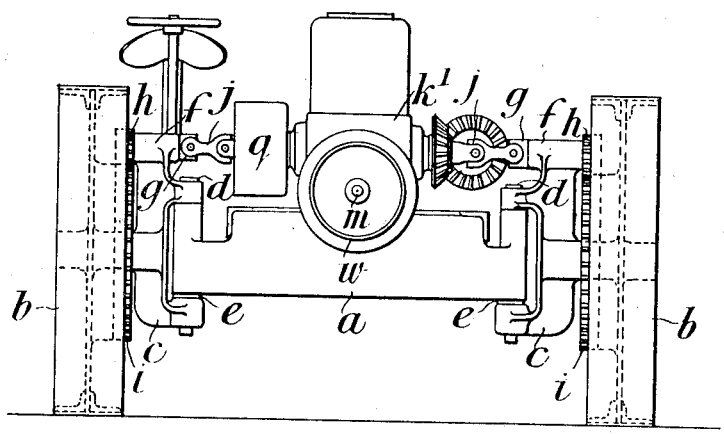
Figure 4:
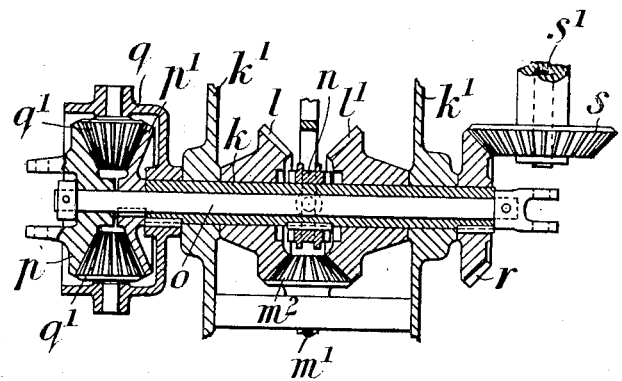

Figure 1 is a side elevation of a tractor provided with my improvements. Fig. 2 is a plan, and Fig. 3 is a front end view. Fig. 4 is a sectional view drawn to a larger scale illustrating the construction of the gearing.

$a$ is the main frame or chassis, $b$, $b$ are the front driving and steering wheels and $b^1$ is the rear driving wheel. Each wheel $b$ is mounted upon an axle fixed to a bracket $c$ pivoted to the frame $a$ by means of a vertical pin $d$ and provided at the bottom with a spring or cushion $e$ upon which the frame rests and at the top with a bearing $f$ through which a counter-shaft $g$ passes, the said counter-shaft being at one end provided with a pinion $h$ engaging with a gear wheel $i$ and at the other end connected by a Cardan or universal joint $j$ to the driving shaft.

The gearing which I advantageously make use of in carrying out my invention is arranged as follows, that is to say, upon a tubular shaft $k$, carried in bearings in the change gear box $k^1$ mounted on the frame $a$, I loosely mount the two bevel wheels $l$, $l^1$ which receive their motion from the engine through the medium of a shaft $m$, the said shaft being driven directly by the engine and transmitting motion through the usual change wheels to a shaft $m^1$ upon one end of which is fixed a bevel wheel $m^2$ engaging with the bevel wheels $l$, $l^1$. Between the latter wheels is mounted a clutch $n$ rotating with the shaft $k$ but connected thereto by a feather so that it may be moved to engage with one or other of the wheels $l$ or $l^1$ according to the direction of rotation to be imparted to the shaft $k$, all in a well known manner.

Through the tubular shaft $k$ is inserted a shaft $o$ upon which are mounted the two wheels $p$, $p^1$ of a differential gear the wheel $p$ being loose upon the shaft and adapted to be directly connected by the Cardan joint to one of the shafts $g$ while the other wheel $p^1$ is fixed to the shaft $o$ which shaft is connected to the Cardan joint of the other shaft $g$.

The balance box $q$ in which the pinions $q^1$, $q^1$ of the differential gear are mounted, is keyed to the tubular shaft $k$ so that it is driven by the engine. The said tubular shaft has also mounted upon it a bevel wheel $r$ from which motion is transmitted to the third wheel $b^1$ through any suitable gearing. As shown, the gearing comprises the bevel wheel $s$, the shaft $s^1$, the bevel gear wheels $s^2$, the sprocket pinion $s^3$, the chain $s^4$ and the sprocket wheel $s^5$ secured to the axis of the wheel $b^1$.

With the arrangement hereinbefore described it will be understood that the rear wheel is always being positively driven by the engine without the intervention of any differential gear and as also one or other of the front wheels which are driven through the differential gear will always be rotating in the required direction it follows that there will always be two wheels on the vehicle that will be driving. It will be noticed that the third or rear wheel $b^1$ runs in a path midway between the paths of the front wheels and thus the operation of the differential gear, when turning corners, is unaffected.

In practice springs are interposed between the axle of the third wheel $b^1$ and the frame and when the driving motion is transmitted to this wheel through the medium of a sprocket chain or the like I advantageously arrange the guides, in which the axle bearings move, obliquely or in a direction at practically right angles to the pull of the chain, as shown in Fig. 1, so that the pull upon the said chain will not tend to compress the spring or prevent the free movement of the frame relatively with the axle.

In the drawing the frame $a$ is represented as having mounted upon it a body or platform $t$ carried by brackets $u$, $u$ which platform may be used for carrying goods when required or for carrying additional weight for increasing the grip of the wheels upon the ground for haulage purposes.

The shaft $m$ is adapted to be directly connected with the engine shaft by means of any clutch, such, for instance, as a friction clutch, as indicated at $v$ in Fig. 1. This shaft $m$ also carries on its end which projects through the gear box a pulley $w$ for a driving belt.

Having now particularly described and ascertained the nature of my said invention and in what manner the same is to be performed, I declare that what I claim is:—

In a motor vehicle or tractor, the combination with a pair of front steering wheels, of a differential gear for driving said wheels, mechanism for positively driving the balance box of said gear, a rear wheel adapted to travel in a path midway between the paths of said steering wheels and mechanism for positively driving said rear wheel from the balance box of said differential gear, substantially as described.

HERBERT PERCY SAUNDERSON.

Witnesses:
  JOHN E. BOUSFIELD,
  C. G. REDFERN.